United States Patent Office 3,474,027
Patented Oct. 21, 1969

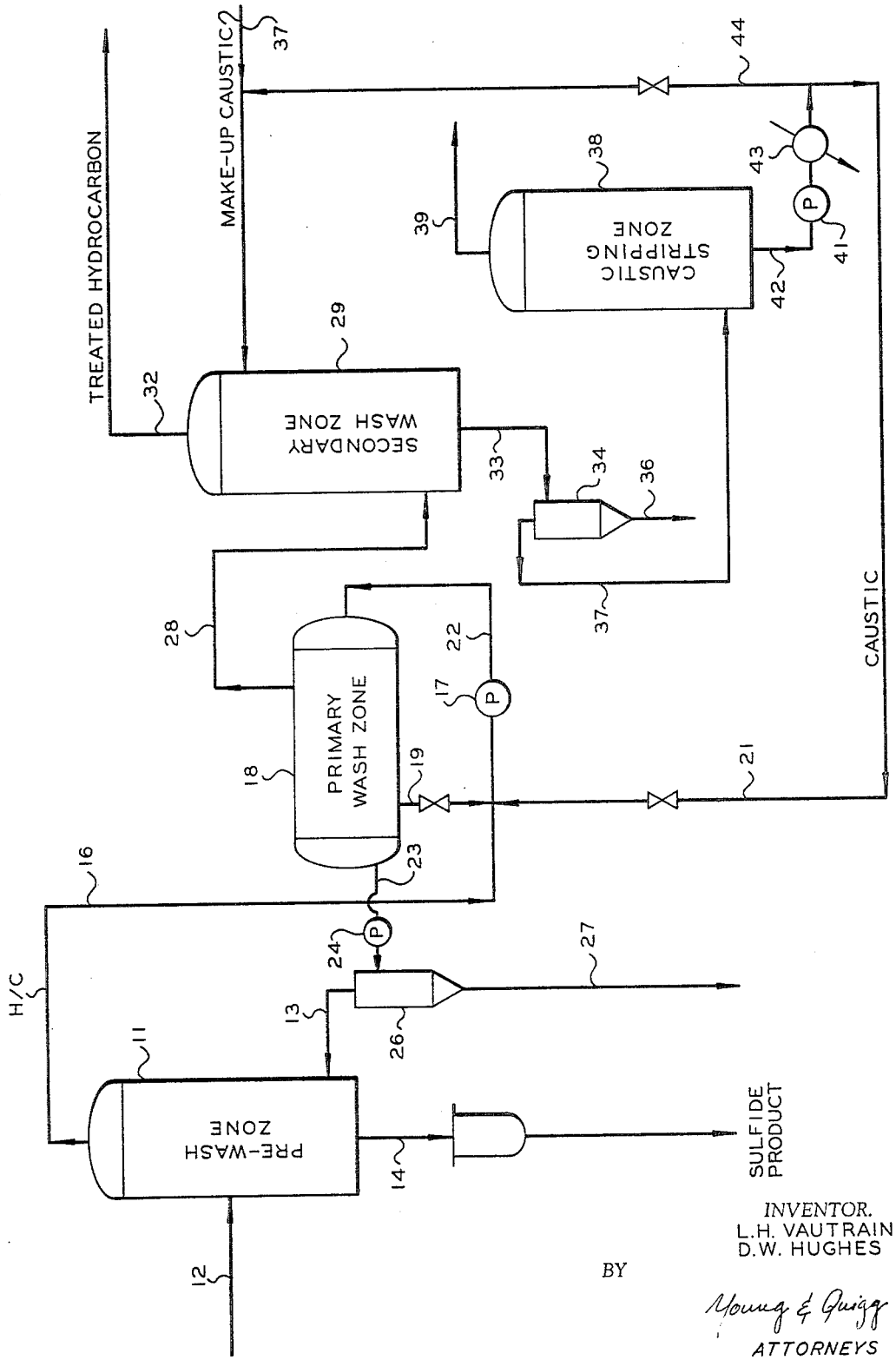

3,474,027
PLURAL STAGES OF SULFUR REMOVAL
Lucien H. Vautrain, Sweeny, Tex., and Darrel W. Hughes, Okmulgee, Okla., assignors to Phillips Petroleum Company, a corporation of Delaware
Filed June 19, 1967, Ser. No. 646,883
Int. Cl. C10g *31/14, 19/00*
U.S. Cl. 208—227        7 Claims

ABSTRACT OF THE DISCLOSURE

A method of treating hydrocarbons with caustic solutions stagewise to remove acidic and sulfur compounds, wherein the hydrocarbon is pretreated by contacting with highly spent caustic to react substantially all of the sodium compounds to NaSH, a valuable sulfide product. The caustic solution is centrifuged between stages to remove undesirable solids impurities.

---

This invention relates to hydrocarbon treatment. In one aspect, the invention relates to an apparatus and process for multistage hydrocarbon treatment. In another aspect, the invention relates to apparatus and process for removal of solids impurities from a multistage hydrocarbon treatment system.

Hydrocarbons are frequently treated stagewise with caustic solutions to remove undesirable acidic and sulfur compounds. Caustic solutions frequently contain insoluble materials, such as metallic sulfides and other precipitates from the compounds present in the caustic dilution water. When left in a system, hard water impurities make the caustic/hydrocarbon mixture or emulsion hard to break. If the emulsion does not break properly, the hydrocarbon carries over (entrains) caustic and decreases the efficiency of subsequent caustic treatments. The invention overcomes this problem by placing centrifuging means between the caustic treatment stages to remove these undesirable solids. When the treating caustic is centrifuged during transfer from one stage to another, the emulsion-breaking difficulties are minimized and the overall efficiency of the treatment process is increased.

In the treatment of hydrocarbons with caustic solutions it is desirable to obtain maximum use of the caustic treating solution. The amount of use of a caustic solution can be measured by determining the degree to which the caustic has reacted. For example, when aqueous sodium hydroxide is used as a caustic solution, completely unreacted NaOH is said to be "0% spent"; NaOH which has been reacted to $Na_2S$ is said to be "100% spent"; and NaOH which has been reacted to NaSH is said to be "200% spent" or "substantially spent." "Partially spent" caustic comprises an aqueous solution of NaOH and $Na_2S$ and "highly spent" caustic comprises an aqueous solution of $Na_2S$ and NaSH. For purposes of this application, the above definitions of "spent" is adopted with respect to sodium hydroxide solutions.

The invention produces an aqueous caustic solution which is substantially reacted to an aqueous solution of NaSH. This substantially spent caustic has had maximum utilization in the treatment process and further provides a concentrated source of sulfides for marketing to other chemical industries.

It is an object of the invention to lower the cost of removing acidic and sulfurous compounds from hydrocarbons.

Another object of the invention is to recover a marketable sulfide solution from a multistage hydrocarbon caustic treatment system.

Another object of the invention is to increase the efficiency of a multistage hydrocarbon caustic treatment system.

Other objects and advantages of the invention will be apparent to one skilled in the art upon consideration of the written description, the drawings, and appended claims.

The drawing is a schematic representation of one embodiment of the invention.

According to the invention, a hydrocarbon contaminated with acidic compounds, including hydrogen sulfide, and mercaptans, is contacted in a first treating zone with highly spent caustic for a time sufficient to remove at least a portion of the hydrogen sulfide from the hydrocarbon and to substantially react the highly spent caustic to NaHS. The treated hydrocarbon is then transferred to a second treating zone where it is treated with partially spent caustic for a time sufficient to remove substantially all of the remaining hydrogen sulfide from the hydrocarbon, thereby producing the highly spent caustic solution used in the first zone. The treated hydrocarbon is then transferred to a third treating zone where it is contacted with fresh aqueous caustic solution comprising sodium hydroxide, for a time sufficient to remove substantially all the mercaptans from the hydrocarbon.

Further, according to the invention, a hydrocarbon contaminated with acidic and sulfur compounds is treated by introducing the hydrocarbon and an aqueous caustic treating solution into a contacting zone. Treated hydrocarbon is withdrawn from the contacting zone. An aqueous phase containing a degree of spent caustic is also withdrawn from the contacting zone and passed through centrifuging means, such as a liquid cyclone or a centrifuge, whereby solids impurities are removed from the caustic. The centrifuged caustic can then be regenerated and returned to the contacting zone for reuse. The removal of solids impurities permits more efficient caustic treatment by allowing the hydrocarbon to separate more readily from the aqueous caustic solution after mixing. Make-up aqueous caustic treating solution is added to the regenerated, centrifuged caustic, the make-up solution containing at least a portion of the solids impurities present in the hydrocarbon treatment process. Other solids impurities, for example, iron sulfide, are formed during the treating operations.

In a case where highly spent caustic is withdrawn from the contacting zone, the aqueous caustic treating solution introduced into the contacting zone can comprise a regenerated caustic and a portion of highly spent caustic, recycled from the contacting zone. The highly spent caustic and the regenerated caustic can be mixed with the hydrocarbon and the resulting mixture can be introduced into the contacting zone. Treated hydrocarbon can then be withdrawn from the contacting zone, upon separation of the mixture. An aqueous phase containing highly spent caustic, having solids impurities, can also be withdrawn from the contacting zone and passed through a centrifuge or liquid cyclone to remove the solid impurities.

Further, according to the invention, there is provided an apparatus for the removal of acidic compounds, including hydrogen sulfide, and mercaptans, from a hydrocarbon comprising a prewasher; means to feed hydrocarbon to the prewasher; a primary washer; a first centrifuging means in communication with the prewasher and the primary washer; means to transfer caustic from the primary washer to the prewasher whereby the caustic is passed through the first centrifuging means; means to transfer treated hydrocarbon from the prewasher to the primary washer; a secondary washer in communication with the primary washer; a caustic stripper in communication with the secondary washer and the primary washer; a second centrifuging means in communication with the secondary washer and the caustic stripper; means to transfer caustic from the secondary washer to the caustic stripper whereby the caustic is passed through the second centrifuging means; means to transfer hydrocarbon from the primary washer to the secondary washer; means to feed make-up caustic (fresh aqueous caustic solution) to the secondary washer; means to transfer regenerated caustic from the caustic stripper to the primary washer and the secondary washer; and means to recycle caustic from the primary washer back to the primary washer.

In the drawing, a prewash zone 11 is provided with a hydrocarbon feed conduit 12 and a caustic feed conduit 13. Conduit 14 provides for the removal of substantially spent caustic solution from prewash zone 11. Conduit 16 communicates with prewash zone 11 and pump 17 for the transfer of pre-treated hydrocarbons from zone 11 to primary wash zone 18. Conduit 19 from primary wash zone 18 communicates with conduit 16 to provide for removal and recycling of caustic solution from zone 18. Conduit 21, carrying regenerated caustic solution, is also connected to conduit 16 so that the fluids flowing in conduits 16, 19, and 21 admix and feed into pump 17. Conduit 22 from the discharge of pump 17 to primary wash zone 18 provides the feed inlet to the zone. Conduit 23 and pump 24 provide for transfer of a portion of the caustic solution from primary wash zone 18 to a centrifuging means 26, from which solids are removed through outlet 27 and from which the caustic solution flows via conduit 13 to prewash zone 11.

Conduit 28 provides for transfer of treated hydrocarbons from primary wash zone 18 to secondary wash zone 29. Conduit 31 communicates with secondary wash zone 29 to introduce fresh aqueous NaOH solution and conduit 32, from zone 29, provides for the recovery of treated hydrocarbons. Conduit 33, from secondary wash zone 29, communicates with a centrifuging means 34 for the removal of caustic solution from zone 29. Centrifuging means 34 is provided with a solids outlet 36 and a conduit 37 to transfer centrifuged caustic solution to caustic stripping zone 38. Caustic stripping zone 38 includes heating means, not shown. Conduit 39 provides for the removal of overhead products from zone 38.

Regenerated caustic solution is removed from zone 38 to pump 41 via conduit 42. Pump 41 discharges the regenerated caustic solution to heat exchanger (cooler) 43. From heat exchanger 43, the regenerated caustic can flow through conduit 44 to be mixed with fresh aqueous caustic solution in conduit 31 or the regenerated caustic can flow through conduit 21 to be admixed with the fluids in conduits 16 and 19.

In the practice of the invention, a hydrocarbon feed contaminated with acidic and sulfur compounds is fed to prewash zone 11 through conduit 12. Highly spent caustic comprising an aqueous solution of Na$_2$S and NaSH is passed through conduit 13 into prewasher zone 11. In zone 11, contaminated hydrocarbon feed is contacted with highly spent caustic and pretreated hydrocarbon is withdrawn via conduit 16 and passed to pump 17. Substantially spent caustic solution, providing concentrated sulfides, is withdrawn from zone 11 through conduit 14.

A portion of highly spent caustic is recycled from primary wash zone 18 through conduits 19 and 16. Regenerated caustic is passed through conduits 21 and 16. In pump 17 the mixture of pretreated hydrocarbon, highly spent caustic, and regenerated caustic is emulsified and passed through conduit 22 to primary wash zone 18 wherein the emulsion is broken.

A second portion of highly spent caustic from primary wash zone 18 is transported through conduit 23 to centrifuge means 26. In centrifuge 26 the highly spent caustic is centrifuged and undesirable solids materials are removed from the solution. Solids-free highly spent caustic is then passed from centrifuge 26 through conduit 13 to prewash zone 11. The solids impurities are removed from centrifuge 26 via outlet 27.

Treated hydrocarbon from primary wash zone 18 is passed through conduit 28 to secondary wash zone 29. Make-up aqueous NaOH solution, containing undesirable solids impurities produced when the caustic solution is prepared from hard water, is added via conduit 31, and regenerated caustic from conduit 44 are fed to secondary wash zone 29. Hydrocarbon is contacted with aqueous caustic solution in secondary wash zone 29 and the hydrocarbon, free of acidic compounds including hydrogen sulfide, and mercaptans, is withdrawn from the secondary wash zone 29 through conduit 32 for further processing, such as water washing, not shown.

Partially spent caustic, comprising an aqueous solution of NaOH and NaSR is withdrawn from secondary wash zone 29 through conduit 33 and passed to a centrifuging means 34 wherein the solution is centrifuged to remove undesirable solids impurities. The centrifuged partially spent caustic is then passed from centrifuging means 34 through conduit 37 to caustic stripping zone 38. Mercaptans (RSH) are stripped from the partially spent caustic; the stripping being accomplished according to the following reactions:

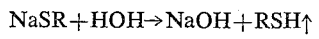

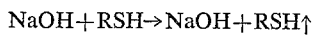

The mercaptans are removed from stripping zone 38 via conduit 39. Regenerated caustic is withdrawn from stripping zone 38 through conduit 42 by pump 41 and passed through heat exchanger (cooler) 43 into conduits 44 and 21. Regenerated caustic is passed through conduit 44 to conduit 31 wherein it is mixed with the fresh aqueous NaOH and fed into secondary wash zone 29. Regenerated caustic is also passed through conduit 21 to conduit 16 and into pump 17 where it is emulsified with the highly spent caustic received from conduit 19 and the pretreated hydrocarbon received through conduit 16. The emulsion is passed from pump 17 through conduit 22 to primary wash zone 18.

It will be understood by those skilled in the art that many details, such as certain valves, have been eliminated from the drawing to simplify and clarify the description of the invention. Such details can be readily added, for example, additional material, controls, duplication of items of equipment described, etc.

Example

In an example according to the invention and utilizing the flow sheet illustrated in the drawing, a hydrocarbon contaminated with acidic compounds, including hydrogen sulfide, and mercaptans, is fed through conduit 12 into prewash zone 11. Fresh aqueous caustic comprising NaOH is fed into secondary wash zone 29 through conduit 31. Prewash zone 11, primary wash zone 18, and secondary wash zone 29 are hollow settling vessels which operate at full liquid level. Packing or other suitable contacting materials can be used in zones 11, 18, and 29, if desired. Stripper 38 can contain packing materials or contact trays. Caustic stripper 38 is a conventional steam stripper comprising a steam coil in the bottom or a separate reboiler (not shown) and a water coil or overhead condenser at the top (not shown). Pumps 17 and 41 are centrifugal pumps. Centrifuging means 26 and 34 are conventional liquid cyclone separators. Feed composition and operating conditions within the various vessels are given in Table I, below.

TABLE I

Conduit 12, feed:
| | |
|---|---|
| Hydrocarbon, b./d. | 1466 |
| Propylene, b./d. | 295 |
| Propane, b./d. | 224 |
| Butylenes, b./d. | 395 |
| Butanes, b./d. | 552 |
| Mercaptans, p.p.m. | 150 |
| H$_2$S, p.p.m. | 1500 |

See notes at end of table.

TABLE I—Continued

Conduit 31:
- Make-up caustic _____ 7.8
- Component:
  - NaOH, wt. percent _____ 18.5
  - Water, wt. percent _____ 81.5

Prewasher 11:
- Temperature, °F. _____ 95
- Pressure, p.s.i.g. _____ 130
- Volume of reagent, bbls. _____ 11
- Contact time, min. _____ 2.6
- Settling time, min. _____ 3.7

Primary washer 18:
- Temperature, °F. _____ 95
- Pressure, p.s.i.g. _____ 130
- Reagent/hydrocarbon vol. ratio _____ 1
- Contact time, min. _____ 0.14
- Settling time, min. _____ 54

Secondary washer 29:
- Temperature, °F. _____ 95
- Pressure, p.s.i.g. _____ 130
- Reagent/hydrocarbon vol. ratio _____ 2
- Contact time, min. _____ 1.5
- Settling time, min. _____ 6.2

Stripper 38:
- Temperature:
  - Top, °F. _____ 225
  - Bottom, °F. _____ 230
- Pressure, p.s.i.g. _____ 10

B./d.=barrels (42 gallons) per day.
P.p.m.=parts per million by weight.

The reactions and the degree to which the caustic is reacted are given in Table II.

TABLE II

Reactions

Secondary washer 29:
$NaOH + RSH \rightarrow NaSR + H_2O$

Primary washer 18:
$Na_2S + H_2S \rightarrow 2NaSH$

Prewasher 11:
$Na_2S + H_2S \rightarrow 2NaSH$

Degree of caustic reaction

| Conduit | Percent (%) "Spent"[1] |
|---|---|
| 31 | 0 |
| 33 | 0–50 |
| 22 | 110–130 |
| 23 | 160–180 |
| 14 | 190–200 |

[1] 0% spent is all NaOH, 100% spent is all $Na_2S$, 200% is all NaSH.

Any NaSH transferred from primary washer 18 to secondary washer 29 reacts with NaOH, spending NaOH which otherwise is utilized to treat out the mercaptans (RSH). The solids-caused emulsion breaking difficulties cause carryover of NaSH which results in 0.5 percent loss of NaOH.

By the practice of the invention the carryover loss is minimized while recovering 190–200% spent caustic solution as a source of sulfides.

Reasonable variation and modification are possible within the scope of the invention which sets forth process and apparatus for treating a hydrocarbon contaminated with acidic compounds including obtaining maximum spending of the caustic treating solution and removal of solids impurities from the caustic treating solution to obtain greater caustic treating efficiency.

That which is claimed is:

1. A process for treating a hydrocarbon contaminated with acidic compounds, including hydrogen sulfide and mercaptans, in a series of treating zones comprising:
   introducing said hydrocarbon into a first treating zone;
   treating said hydrocarbon in said first treating zone with highly spent caustic consisting essentially of an aqueous solution of $Na_2S$ and NaSH for a time sufficient to partially remove said hydrogen sulfide thereby producing a substantially spent caustic consisting essentially of an aqueous solution of NaSH;
   transferring said hydrocarbon from said first treating zone to a second treating zone;
   treating said hydrocarbon in said second treating zone with partially spent caustic consisting essentially of an aqueous solution of NaOH and $Na_2S$ for a time sufficient to remove substantially all of said hydrogen sulfide and most of said mercaptans thereby producing said highly spent caustic;
   transferring said hydrocarbon from said second treating zone to a third treating zone;
   treating said hydrocarbon in said third treating zone with fresh caustic comprising an aqueous solution of NaOH for a time sufficient to remove substantially all of said mercaptans, thereby producing said partially spent caustic; and
   recovering treated hydrocarbons from said third treating zone.

2. The process of claim 1 including:
   recovering said substantially spent caustic from said first zone.

3. The process of claim 1 including:
   withdrawing an aqueous phase containing highly spent caustic from said second zone;
   centrifuging said highly spent caustic to remove solid impurities therefrom; and
   introducing said centrifuged highly spent caustic into said first zone.

4. The process of claim 1 including:
   withdrawing an aqueous phase containing partially spent caustic from said third zone;
   centrifuging said partially spent caustic to remove solid impurities therefrom;
   regenerating said centrifuged caustic in a regeneration zone; and
   recycling the regenerated caustic to said third zone.

5. The process of claim 4 including:
   recycling said regenerated caustic to said second zone.

6. The process of claim 5 including:
   withdrawing highly spent caustic from said second zone and admixing it with said regenerated caustic and said hydrocarbons being transferred from said first to said second zone.

7. A process according to claim 1 wherein: said highly spent caustic is from 160 to 180% spent; said partially spent caustic is from 110 to 130% spent and consists essentially of an aqueous solution of $Na_2S$; said fresh caustic consists essentially of NaOH; and a stream of substantially spent caustic which is from 190 to 200% spent and consists essentially of NaSH is withdrawn from said first zone.

References Cited

UNITED STATES PATENTS

| | | | |
|---|---|---|---|
| 2,727,850 | 12/1955 | Stanley et al. | 208—204 |
| 2,754,251 | 7/1956 | Gordon et al. | 208—204 |
| 3,013,965 | 12/1961 | Ferrara et al. | 208—204 |
| 3,103,486 | 9/1963 | Walls et al. | 208—208 |

DELBERT E. GANTZ, Primary Examiner

G. J. GRASANAKIS, Assistant Examiner